Figure 1:
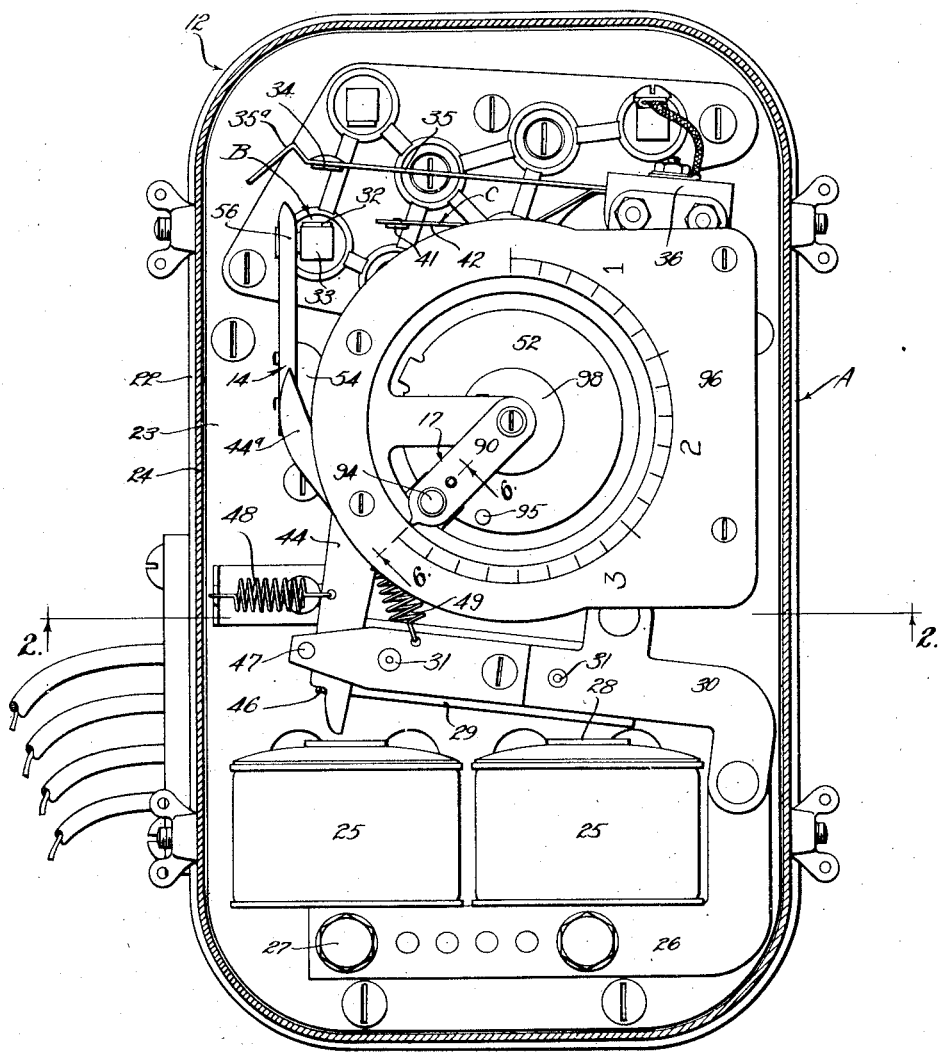

Inventors.
Lloyd F. Hunt
and
Edward W. Rockwell
By W. H. Chapwell
Their Attorney

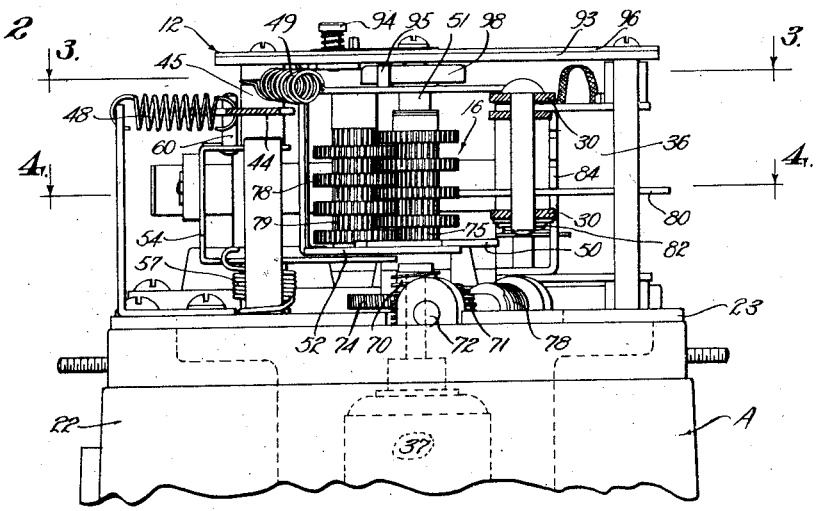

Inventors
Lloyd F. Hunt
and
Edward W. Rockwell
By
Their Attorney

July 10, 1934.    L. F. HUNT ET AL    1,965,895
CIRCUIT RECLOSING SYSTEM
Filed July 27, 1932    4 Sheets-Sheet 4

Fig. 8.

Fig. 7.

Inventors
Lloyd F. Hunt
and
Edward W. Rockwell
By
Their Attorney

Patented July 10, 1934

1,965,895

UNITED STATES PATENT OFFICE 1,965,895

CIRCUIT RECLOSING SYSTEM

Lloyd F. Hunt and Edward W. Rockwell, Los Angeles, Calif.

Application July 27, 1932, Serial No. 625,134

17 Claims. (Cl. 175—294)

This invention has to do with a means or system for resetting an electrically actuated device following operation of the device, and has particular reference to a system or control for automatically reclosing a circuit breaker, or the like. It is a general object of the present invention to provide a simple, effective and dependable system for automatically resetting or reclosing a circuit breaker, or the like.

Disturbances in an electric circuit that result in the opening or a circuit breaker in the circuit are usually of short duration, therefore it is desirable to provide a device or reclosing system for automatically reclosing the circuit breaker a reasonable number of times at suitable time intervals after the initial opening of the circuit breaker, and thus attempt to restore the circuit.

The majority of automatic reclosing mechanisms or systems such as have been heretofore put into use in connection with circuit breakers have been complicated and not altogether dependable or practical. The electrical reclosing systems that have been used involve delicate relays and complicated circuits, and in most instances, do not result in the most advantageous or desired operation of the breaker.

It is an object of this invention to provide a practical and effective circuit reclosing system in which a circuit breaker is automatically reclosed at a predetermined time after it has been opened by a disturbance in the line that it protects, and is automatically reclosed a given number of times at definite time intervals in the event that the trouble or disturbance in the line continues.

It is a further object of this invention to provide an automatic reclosing system for a circuit breaker which is put into operation by the momentary closing of a contact before the breaker is ready to reclose and which completes a predetermined cycle of operation upon being put into operation.

Another object of this invention is to provide a reclosing system of the type mentioned which returns to its original unactuated condition ready for another operation after a predetermined time interval after the last reclosing of the breaker. The time delay following the last reclosing of the breaker before the system returns to its original condition is such as to allow the breaker to fully open if the fault in the protected circuit has not cleared.

It is another object of the invention to provide a reclosing or restoring system for an electrical circuit that may be readily regulated to provide for a given interval of time between the initial opening of the circuit breaker and the first automatic reclosing of the circuit breaker and to provide for any desired timing of the succeeding automatic reclosing operations.

It is another object of this invention to provide an automatic circuit reclosing system of the character mentioned that may be easily set or adjusted to provide for the reclosing of the circuit breaker any desired or given number of times.

It is another object of the invention to provide a timer for an automatic reclosing or resetting system of the character mentioned in which the principal parts and mechanisms are in a simple and self-contained unit.

Figure 4:
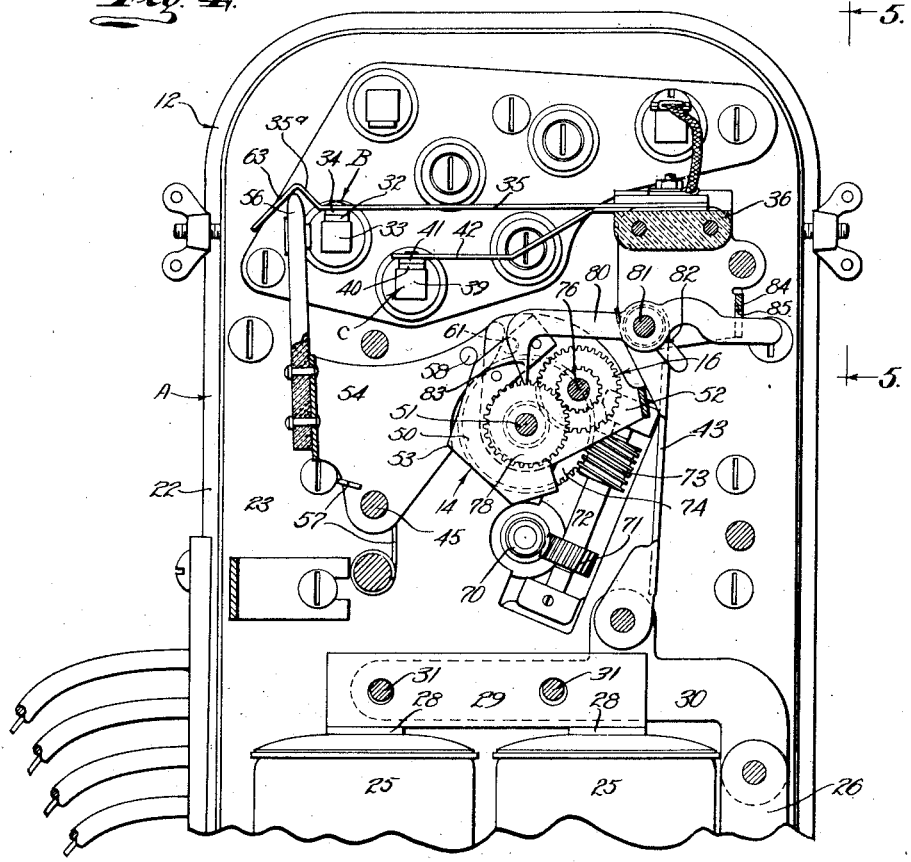
Figure 5:
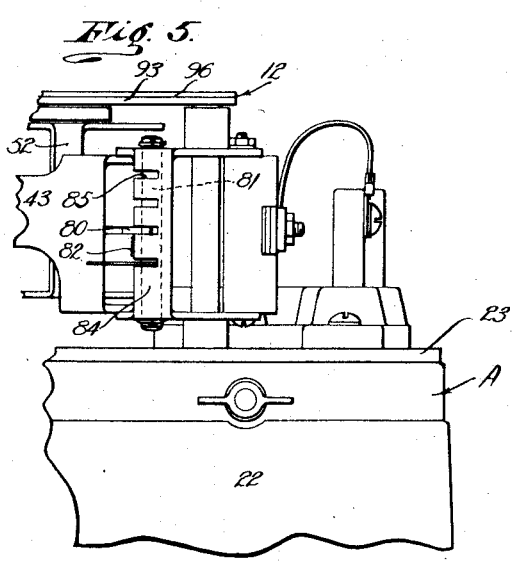
Figure 6:
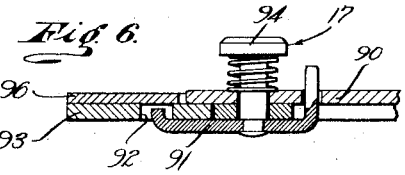

Further objects and features of the invention will be best and more fully understood from the following detailed description of a typical form and application of the invention, throughout which description reference is had to the accompanying drawings, in which:

Fig. 1 is a sectional view taken immediately inside of the main or timer unit embodied in the invention, showing the principal parts of the mechanism in elevation. Fig. 2 is an end elevation of the principal parts of the mechanism shown in Fig. 1, being a view taken substantially as indicated by line 2—2 in Fig. 1. Fig. 3 is a detailed sectional view taken substantially as indicated by line 3—3 on Fig. 2. Fig. 4 is a detailed sectional view taken substantially as indicated by line 4—4 on Fig. 2. Fig. 5 is a fragmentary side elevation of the mechanism, being a view taken substantially as indicated by line 5—5 on Fig. 4. Fig. 6 is an enlarged fragmentary sectional view of the latch of the adjusting means, being a view taken substantially as indicated by line 6—6 on Fig. 1. Fig. 7 is an enlarged detailed sectional view of the drive means for the timer cam. Fig. 8 is a diagram of the system provided by the present invention.

In accordance with the broader aspects of the invention, the apparatus or system provided by the present invention may be employed in various situations and in connection with apparatus of different characters and types, and may be utilized for various purposes. Further, it will be apparent to those skilled in the art that there may be considerable variation in the form and construction of the several parts or units which enter into the system of the invention.

To facilitate an understanding of the invention, we will describe it as embodied in a system for automatically reclosing an electrical circuit, and more specifically, to automatically reclose a typical circuit breaker, and we will refer to certain parts and units which are merely typical of those that may be used. It is to be understood that the present invention is not to be construed as restricted or limited to the specific details of application about to be described, but is to be taken as including any features or modifications that may fall within the scope of the claims.

The typical application of the invention illustrated in the drawings, includes generally, an actuated device 10 in the form of a circuit breaker arranged in a main line or circuit 11, a timer or reclosing relay 12 for controlling the resetting, or reclosing of the device 10, a trip coil 13 in connection with the breaker 10 for tripping or releasing it, a reclosing coil 100 in connection with the breaker for reclosing it, a multiple contact switch 101 operated by the breaker, a trip free relay 102, a control relay 103, manual control switches 104 and 105, an overload relay 106, and various connections and other parts, the details of which will be hereinafter described.

The actuated element or device 10 may be any suitable or desired type of circuit breaker suitably related to parts or units such as the trip coil 13, reclosing coil 100, switch 101, etc. In the drawings, the circuit breaker 10 is illustrated diagrammatically and the connections between the breaker and its related parts or units are shown schematically, it being understood that the present invention is not concerned with the details of the breaker or the connections employed in properly relating the various parts of the breaker.

In the diagram, the breaker 10 is shown as though provided with an extension 110 to which the various parts to be related to the breaker are connected. A spring 111 is connected to the extension 110 and normally tends to open the breaker. A latch 112, adapted to be operated or released by the trip coil 13, normally cooperates with a projection 115 on the extension to hold the breaker closed. The closing coil 100 is related to the extension to close the breaker against the action of the spring 111.

The multiple contact switch 101 operated by the breaker includes three spaced contacts 116, 117 and 118 operated by the extension 110, two stationary contacts 119 and 120 arranged to cooperate with contact 116, a stationary contact 121 arranged to cooperate with contact 117 and a stationary contact 122 arranged to cooperate with the contact 118. Contact 116 engages contact 119 when the breaker is closed and engages the contact 120 when the breaker is open. Contact 117 engages contact 121 when the breaker is open, and contact 118 momentarily engages contact 122 as the breaker moves between the closed and opened positions. The various contacts mentioned are connected with other parts of the apparatus as will be hereinafter described.

The timer relay 12 includes generally, a switch B for controlling the circuit in which the reclosing coil 100 is connected, a latching mechanism to hold the timer in operation until it has completed its cycle of operation, a release means for the latching mechanism, and a drive for operating the switch B and the said means. The timer relay 12 embodies various features of novelty, and is a vital and unique element contemplated by the invention, and therefore we have illustrated it in detail and will now describe it in detail.

The relay 12 includes a suitable body or case 22 having a base plate or mounting plate 23 which carries the principal parts of the mechanism. A removable cover 24 may be provided to enclose the parts supported on the plate. The latching mechanism of the relay includes a pair of solenoid coils 25 supported on the plate 23 through a frame 26 and posts 27. The circuit in which the coils 25 are connected as hereinafter described, is momentarily completed or energized upon opening of the circuit breaker 10. Upon energization of the coils 25, their cores 28 attract armature 29, carried by spaced arms 30 pivotally connected to the frame 26. The armature 29 may be of laminated construction and connected to the arms 30 by spaced rods 31. The rods 31 pass through openings in the armature 29 with suitable clearance to permit limited play of the armature when it is attracted by the coils 25. The pivoted arms 30 are normally held in positions where the armature 29 is spaced from coils 25 as hereafter described.

A latch is provided for releasably holding the armature 29 in the actuated position upon its being moved thereto. The latch includes a lever 44, pivoted between its ends on a post or pin 45 projecting from the base plate 23. One end of the lever 44 is normally adjacent the outer end of the armature 29 and is provided with a shoulder 46 adapted to cooperate with a pin 47 on an arm 30. Upon momentary energization of the coils 25 and the resultant movement of the armature 29, the pin 47 comes into engagement with the shoulder 46 so that the lever 44 holds the armature in the actuated position. A spring 48 is provided to yieldingly urge the lever 44 to the position where the pin 47 comes into engagement with the shoulder 46. A suitable spring 49 is connected between the armature 29 and the post 45 to normally yieldingly hold the armature away from the coils 25.

The contact device 14 includes a switch B for controlling the circuit of the reclosing coil 100. The switch B may include a stationary contact 32 on a post 33 projecting from the mounting plate 23, and a contact 34 carried on a spring arm 35. The contact 34 is normally spaced a considerable distance from the contact 32. The contact arm 35 is carried by a pivoted block 36 of insulated material operatively connected with the armature 29. A link 43 is pivotally connected to the armature supporting arms 30 and to the block 36 to form an operating connection between the armature 29 and the block 36. Upon energization of the coils 25, the block 36 is pivoted to a position where the arm 35 normally tends to bring the contact 34 into engagement with the fixed contact 32. The contact 34 is normally held out of engagement with the contact 32 by a finger 56. Movement of the arm 35 is controlled by a cam 50 and the finger 56.

The cam is mounted to turn freely on a shaft 51 and is adapted to be operated by the drive hereinafter described. The cam 50 may be in the nature of a flat plate and may be carried by or attached to a suitable carrier 52 mounted to rotate or turn on the shaft 51. The cam 50 projects outwardly from the carrier 52 and its projecting edge is in the nature of a cam face. The active edge or face of the cam 50 is provided with a plurality of points or projections 53 spaced apart circumferentially relative to the shaft 51. The projections may be equally spaced. In the particular embodiment of the invention illustrated in the drawings, there are three cam projections 53, it being understood that there may be more if desired. The cam 50 is adapted to actuate or move the finger 56 which controls the switch B. The finger 56 is on an arm 54 pivoted on the pin or post 45. Finger 56 is of insulating material and engages the contact arm 35. When the armature 29 is latched in its actuated position, the block 36 is held in a position where the contact arm 35 would, if not engaged by the finger 56, hold the contact 34 in engagement with the contact 32.

A spring 57 engages and acts upon the arm 54 to yieldingly urge it to a position where the finger 56 engages the arm 35 to hold the switch B open. The arm 35 has an inclined part 35ª which cooperates with the outer end of the finger 56 to open the switch B upon the finger being moved into camming engagement with the inclined part 35ª. In the arrangement illustrated, the arm 54 extends under the cam 50 and carries pin 58 adapted to be engaged by the cam projections 53. When a cam projection 53 engages a pin 58, the arm 54 is pivoted or moved outwardly, moving the finger 56 so that the arm 35 is allowed to operate the contacts 32 and 42 into engagement. It is preferred to shape the cam projections 53 so that the mechanism operates to momentarily allow the contacts 32 and 34 to engage as the projection passes pin 58.

The release means provided by the present invention for releasing the latching mechanism above described includes generally, a cam projection 61 located behind the last projection 53 to function or come into operation following the last cam projection 53. The cam projection 61 is spaced a suitable distance from the last cam projection 53 so that there is a suitable time interval between engagement of the pin 58 by the last cam projection 53 and the engagement of the pin 58 by the cam projection 61. The cam projection 61 is longer than projections 53 and therefore operates to move the arm 54 further than the cam projections 53. The latch lever 44 has an extension 44ª positioned to be engaged by pin 60 on the arm 54 when the arm 54 is operated by the cam projection 61. The parts are proportioned and the arm 54 moved so that the pin 60 moves the lever arm extension 44ª to disengage the latch lever from the pin 47, thus releasing the latch mechanism allowing it to be returned to its normal unactuated position as illustrated in Fig. 1. Upon return of the latching mechanism to its normal unactuated position, the block 36 is operated to a position where the arm 35 holds the contacts 32 and 34 apart.

During the operation of the mechanism just described, the finger 56, in the course of being operated due to cooperation of the cam projection 61 and the pin 58, moves from the part 35ª of arm 35, allowing the contacts 32 and 34 to engage and then moves into engagement with the part 63 at the outer end of the arm 35 so that the arm 35 is operated to open the contacts 32 and 34. With this arrangement the switch B is momentarily closed in the course of the mechanism being finally operated through cooperation of projection 61 and pin 58. The parts are proportioned and related so that the pin 60 does not release the latch 44 until the circuit breaker has had time to close and to reopen in the event the protected line is not clear following the closing of the contacts 32 and 34 in the course of the arm 54 being moved by the cam projection 61.

The drive for operating the contact device includes generally, a suitable motor 37 mounted within the case 22 and controlled by a switch C. The switch C is normally open, and is adapted to be automatically closed so that the circuit to the motor 37 is closed upon actuation of the armature 29 by the coils 25. Switch C, as illustrated in the drawings, includes a post 39 carrying a fixed contact 40 and a spring arm 42 carried by the block 36 and provided with a contact 41 to cooperate with the contact 40. The arm 42 is related to the post 39 so that the contacts 40 and 41 remain in engagement so long as the armature 29 is in the operated position shown in Fig. 3. Immediately upon the latch mechanism being released through the action above described, the arm 42 is moved by the block 36 to the position where the contacts 40 and 41 are apart or open, thus disconnecting the motor 37. The motor 37 is provided to operate or turn the cam 50 so that the cam parts 53 and 61 function as hereinabove described. In accordance with the broader principles of the invention, any suitable drive or operating connection may be provided between the motor 37 and the cam. In the form of the invention illustrated, we have disclosed a regulatable means or variable drive means 16 whereby the cam may be driven at any one of a plurality of different speeds.

The drive means 16 may be regulated to provide for movement of the cam 50 at any one of a plurality of different rates of speed and thus control the timing of the impulses in the closing circuit 15. The drive means 16 includes a worm 70 on the shaft of the motor 37 meshing with a worm wheel or pinion 71 on a shaft 72. The shaft 72 carries a worm 73 meshing with a worm wheel or worm gear 74. The gear 74 is free on the shaft 51 and has a bushing portion projecting through an opening in the cam carrier 52. A pinion 75 is provided on the outer end of the gear 74. A counter shaft or planetary shaft 76 is rotatably supported by spaced parts of the cam carrier 52. The planetary shaft 76 is spaced from and is parallel to the main shaft 51 as illustrated throughout the drawings. A plurality of cluster or compound gears are provided on the shafts 51 and 76. The compound gears are independently rotatable on the shafts and the gears on one shaft cooperate with the gears on the other shaft. The several compound gears on the two shafts may be alike and each consists of a large gear 78 and a pinion 79 formed or connected together. The gears on the two shafts 51 and 76 are related or positioned so that the pinions 79 of the gears on one shaft mesh with the gears 78 on the other shaft as shown in Fig. 7. The pinion 75 on the main drive gear 74 cooperates with the innermost gear 78 on the planetary shaft 76.

The invention includes means for holding any one of the compound gears on the main shaft 51 against rotation. A catch or pawl 80 is pivoted on and adjustable longitudinally of a post or rod 81 carried by the block 36. A spring 82 is provided to normally yieldingly hold the pawl 80 in a position where its pointed active end 83 cooperates with one of the larger gears 78 on the shaft 51. The pawl or catch 80, in being shiftable longitudinally on the post 81, may be adjusted to cooperate with any one of the compound gears on the shaft 51. A setting or locking rack 84 is connected with the block 36. A plurality of spaced slots or notches 85 is provided in the rack 84 to receive the outer end of the pawl 80. The pawl 80 may be adjusted longitudinally on the rod 81 to position its outer end in any one of the several notches 85. When the pawl is in cooperation with a notch 85, its active end 83 is in holding engagement with or is positioned to engage one of the compound gears on the shaft 51. When the motor 37 is energized and one of the compound gears on the shaft 51 is held against turning, the gearing described above causes the cam carrier 52 to turn about the shaft 51. The speed of turning of the group of compound gears and the cam carrier 52 is in any event, comparatively slow. It will be apparent how the speed of turning of the cam carrier 52 and the parts associated therewith may be regulated and governed by setting the pawl 80 in different positions to engage any one of the several gears 78 on the shaft 51. It will be understood how the holding of the outer gears 78 by the pawl 80 causes the cam carrier 52 to be turned at a relatively slow speed and how the holding of the inner gears 78 on the shaft 51 causes the cam carrier 52 to be turned at a relatively high speed.

Means 17 is provided to limit or vary the extent of turning of movement of the cam carrier 52 and cam 50 to provide for different numbers of actuations or reclosings of the circuit breaker. The means 17 is also operable to regulate or vary the interval of time between the initial opening of the circuit breaker 10 and the first reclosing of the circuit breaker. The means 17 is in the nature of an adjustable stop means and includes an arm 90 pivoted on the upper end of the stationary shaft 51, and carrying a spring pressed latch 91. The latch 91 is provided to cooperate with any one of a plurality of circumferentially spaced openings 92 in a top plate 93. The latch 91 may be controlled or depressed by means of a push button 94. The button 94 may be depressed to release the latch 91 to permit the arm 90 to be swung to any desired position. A projection or pin 95 is provided on the upper end of the cam carrier 52 and is adapted to be engaged by the latch 91 on the adjustable stop arm 90. In setting or regulating the apparatus, the latch 91 may be depressed and the arm 90 swung to any desired position. As the latch 91 engages the pin 95, movement or adjustment of the stop arm 90 causes corresponding movement of the cam carrier 52. A suitable dial or calibration plate 96 may be provided on the top plate 93 to indicate the normal unactuated positions of the several cam projections 53. The marks or calibrations on the plate 96 also indicate the amount of movement of the cam prior to the initial closing of the switch B, and therefore when read together with the position of the pawl 80, indicates the interval of time between the first opening of the circuit breaker 10 and the first closing impulse given the circuit 15.

Means is provided to return the cam carrier 52 and the parts connected therewith to their normal positions after actuation. A suitable spring 97 is connected between the cam carrier 52 and a fixed cap 98. The cap 98 houses or encloses the spring 97. The spring 97 may normally be under a certain torsional strain and is subjected to increased strain upon turning or actuation of the cam carrier 52 so that it operates to return the cam carrier 52 upon release of the latch 44. The pawl 80, in being carried by the block 36 is automatically disengaged from the gear on the shaft 51 when the latch 44 is released and the armature is returned to its unactuated position by the spring 49.

When the parts are in their normal or unactuated positions, the switches B and C are open and the armature 29 is in the out position illustrated in Fig. 1 of the drawings. The pawl 80 may be set to provide for any desired speed of movement of the cam 50, and the stop arm 90 may be set to provide for any desired number of actuations or reclosures of the circuit breaker 10.

Fig. 5 of the drawings shows the pawl 80 in a position where the cam 50 will be turned at a moderate rate of speed, while Fig. 1 shows the stop arm 90 set where the cam 50 is operable to cause three reclosures of the circuit breaker 10. The stop arm 90 is shown in the fully "over" position where a maximum time interval is provided between the initial opening of the circuit breaker 10 and the first reclosing of the circuit breaker. It is believed that it will be understood how the mechanism may be adjusted to provide for any desired time interval between the initial opening and the first reclosing of the circuit breaker and for the desired timing of the other reclosures of the circuit breaker.

The various elements or units hereinabove referred to are connected and related in accordance with the present invention so that as the breaker 10 opens, a momentary impulse caused by momentary contacting of contacts 118 and 122 puts the timer relay 12 into operation so that it causes operation of the closing coil 100, a predetermined number of times and at predetermined time intervals and finally, a predetermined time after the last reclosing operation, the timer automatically restores or resets itself ready for another operation.

The system or apparatus provided by the invention is adapted to be operated by a circuit independent of that carried by line 11, for instance, by the operating circuit of the substation or other location at which the equipment is installed. In the diagram we have shown the apparatus of the present invention operatively connected with lines 135 and 136 of an operating circuit. A line 137 from the line 136 of the operating circuit connects with contacts 122 and 121 of the multiple switch 101 and with contact 138 of the control relay 103. The line 139 from the line 135 of the control circuit connects with contact 116 of the switch 101, with one terminal of the closing coil 100 and with one terminal of winding 140 of the trip free relay 102.

The trip free relay includes a pair of spaced contacts 141 and 142 and a pair of spaced contacts 143 and 144. The second terminal of winding 140 is connected to the contact 142. Contacts 141 and 144 are connected to a line 145 which extends to the timer relay and is connected with contact 32 of switch B. Contact 143 of the trip free relay is connected to one terminal of the winding of the control relay 103 by line 146. The trip free relay has a movable element 147 operated by the winding 140 above described and a winding 148 connected parallel with the trip coil 13. The winding 148 and coil 13 are connected by line 150.

The control relay includes a pair of spaced contacts 138, and 151, a movable element 152 for cooperation with the contacts and a winding 153. One terminal of the winding 153 is connected with the trip free relay through connection 146, while the other terminal is connected with contact 116 of the switch 101 by connection 155. Contact 151 of the control relay is connected with one terminal of the closing coil by a connection 156, the other terminal of the closing coil being connected with line 139.

The trip coil 13 has one terminal connected with the line 135 by a connection 180, contacts 119 and 116, and connection 139, and has the other terminal connected with line 136 by connection 161. The overload relay X controls the connection 161. The winding 106 of the overload relay X is connected in series with an inductance coil 162 related to one of the lines 11.

The motor 37 of the timer 12 has one terminal connected with line 135 by connection 170 and the other terminal connected with line 136 through switch C. The contact 34 of switch B is connected with line 136 by a connection 172. The coils 26 of the timer 12 are connected with line 35 by a connection 170 and with line 136 by connection 176, contacts 118 and 122, of switch 101, and line 137.

The manual switches 104 and 105 are for tripping and closing the breaker, respectively. The manual switches are connected in the line 176 to normally close it. The switch 104 is operable to open a connection 176 and close a connection 177 between connection 161 and line 136. The closing switch 105 is operable to open the connection 176 and close a connection 178 between connection 145 and the line 136.

Signal lamps 160$^a$ and 160$^b$ are provided to indicate the position of breaker 10. When the breaker is closed as shown in Fig. 8, lamp 160$^b$ is energized from line 136 through line 160 contacts 119 and 116 and line 139 which connects with line 135. When the breaker is open lamp 160$^a$ is energized from line 135 through connection 160, contacts 117 and 121 and line 137 that connects with line 136.

Upon the occurrence of a fault on lines 11 an excess current is induced in winding 162 which current acting in winding 106 of the overload relay X causes the relay to close and complete the circuit through line 161 to the trip coil 13 thus tripping the circuit breaker which through closing of contacts 118 and 122 closes the initiating circuit through connection 170 through coils 25 of the timer relay, connection 176, switches 104 and 105, contacts 118 and 122, and the line 137 which connects with line 136.

The initiating circuit is momentarily established as contacts 118 and 122 engage during opening of the breaker. The momentary energization of the coils 25 sets the latch mechanism of the timer, thus establishing the circuit through the motor 37 and switch C, while the circuit through the coils 25 is broken as the contacts 118 and 122 disengage. The motor 37 being energized, the contact mechanism of the timer starts operation and after a predetermined time interval, the cam of the timer operates to a position where the switch B is closed momentarily. Closing of the switch B completes a reclosing circuit through connection 172 from line 136, switch B, connection 145, contacts 144 and 143 of the trip free relay, the winding 153 of the control relay, connection 155, contacts 116 and 120 of switch 101, and line 139 which connects with line 135. This results in closing of the control relay and energizing of the circuit breaker closing coil 100 through line 139, connection 156, contacts 151 and 138 of the control relay 103, and connection 137 which connects between the contact 138 of the control relay, and lines 136. The operation thus far described occurs upon the occurrence of any fault on the lines 11 protected by the circuit breaker such as to cause opening of the breaker.

If the fault persists, the relay X closes completing a circuit through line 139, contacts 119 and 116 of the switch 101, the connection 180 between the contact 119 of the trip coil 13, connection 150, connection 161 and the relay X which connects the trip coil with line 136. At the same time, the winding of the trip free relay is energized through the connection 150, thus operating the trip free relay so that a circuit is closed through the trip free contacts 141 and 142 and a connection 145, the timer contacts 32 and 34 and line 172 which connects with line 136, and from the trip free relay contacts 141 and 142 through the winding 140 of the trip free relay, and line 139 which connects with line 135. The winding 140 of the trip free relay being energized locks the movable element 147 of the trip free relay up until the switch B of the timer is open. When the movable element of the trip free relay is locked, the circuit through the control relay is open so that the breaker does not close. When the switch B of the timer relay 12 closes through the operation of the relay it may remain closed long enough to allow for complete closing of the breaker and opening of the breaker 10 if the fault persists to reopen the breaker the trip free relay 102 functions to prevent a second reclosing of the breaker while the switch B of the timer remains or continues closed following closing to initiate a closing of the breaker. The breaker will not close until the trip free relay is reset, as by opening of the contact B in the timer. It is to be understood of course, that should the fault have been corrected upon the closing of the circuit through the switch B of the timer as hereinabove described, the breaker would have operated through the closing coil 100, and would have remained closed. The timer having been put in operation by the motor 37, continues in operation closing the switch B a definite number of times at definite time intervals and when the switch B closes after the fault in the line protected by the breaker has cleared, the breaker will be closed and will remain in, or closed whereas if the fault persists, the breaker will not remain closed but will open due to the overload relay closing when the breaker closes and a fault exists in the protected line. After the switch B of the timer has been closed the predetermined number of times and after a predetermined interval following the last closing of the switch B of the timer, the latch of the timer is released allowing the entire timer mechanism to be reset or be re-established ready for further operation. The time interval between the last closing of the switch B and the releasing of the latch mechanism by the timer is such as to give the circuit breaker full time for complete operation.

It will be obvious that the initiation of the timer relay does not have to be made by a momentary contact device operated during opening of the breaker as hereinabove described but may be effected by any momentary contact made before the breaker is ready to reclose, as, for instance, many commonly used circuit breakers include recocking devices or mechanisms which function following the opening operation and before the breaker will function to reclose, which recocking devices or mechanisms or like means may be employed to operate contacts 118 and 122 of our system. From the foregoing description, it will be obvious that the invention provides a simple, practical and dependable reclosing system, a feature of the invention being the timer mechanism hereinabove described which is mechanically latched or set in operation upon being initiated upon opening of the circuit breaker. The timer upon being initiated or being set in operation, completes or follows through a complete cycle of operation, namely, the closing of the reclosing circuit through contact B a predetermined number of times with predetermined time intervals between the times the switch is closed. It is also significant to note that the timer is not at any time locked or set out of service, but that it returns to its original position ready for further operation as soon as the latch mechanism is released following the last closing of the switch B. Further, it is significant that the timer is mechanically latched in service upon being set in service by opening of the breaker, the mechanical latching of the timer being more dependable and positive in action than electrical locks or setting devices such as heretofore have been proposed in devices of this character.

Having described only a typical preferred form of our invention, we do not wish to limit ourselves to the specific details set forth, but wish to reserve to ourselves any changes or variations that may appear to those skilled in the art or fall within the scope of the following claims:

Having described our invention, we claim:

1. In combination, a circuit breaker in a main line, a closing coil for the breaker, a control relay for the closing coil, a timer relay for governing the control relay, a switch in the timer relay, a control circuit momentarily closed by the breaker upon opening of the breaker, electromagnetic means energized by the control circuit, power means, a circuit for energizing the power means closed by the electro-magnetic means, and means operable by the power means for causing the switch to be closed a predetermined number of times.

2. In combination, a circuit breaker in a main line, a closing coil for the breaker, a control relay for the closing coil, a timer relay governing the control relay a switch in the timer relay, a control circuit momentarily closed by the breaker upon opening of the breaker, electro-magnetic means energized by the control circuit, power means, a circuit for energizing the power means, means actuated by the electro-magnetic means for closing the last mentioned circuit and for conditioning the switch in the timer relay, and a cam operated by the power means for causing the switch to be closed a predetermined number of times, and means opening the control relay subsequent to energization of the closing coil to permit only one closing of the breaker for each impulse of the timer relay.

3. In combination, a circuit breaker in a main line, a closing coil for the breaker, a control relay for the closing coil, a timer relay governing the control relay a switch in the timer relay, a control circuit momentarily closed by the breaker upon opening of the breaker, electro-magnetic means energized by the control circuit, power means, a circuit for energizing the power means, means actuated by the electro-magnetic means for closing the last mentioned circuit and for conditioning the switch in the timer relay, a releasable latch for holding the last mentioned means in operating position, means operated by the power means for causing the said switch to be closed a predetermined number of times, and means for releasing the latch at the termination of operation of the last mentioned means, and means opening the control relay subsequent to energization of the closing coil to permit only one closing of the breaker for each impulse of the timer relay.

4. In combination, a circuit breaker, reclosing means for the breaker, and a control for the reclosing means including, a control switch for said means, operating means for the switch actuated by the breaker upon opening of the breaker and operable when actuated to operate the switch a predetermined number of times, and means for then resetting the operating means.

5. In combination, a circuit breaker, reclosing means for the breaker, and a control for the reclosing means including, a control switch for said means, a timer mechanism for the switch having a single determinate cycle of operation including closing the switch a predetermined number of times and returning to its original condition, and a connection between the breaker and the timer whereby the timer is put into operation by the breaker when the breaker is opened.

6. In combination, a circuit breaker, reclosing means for the breaker, and a control for the reclosing means including, a control switch for said means, a timer mechanism for the switch having a single determinate cycle of operation including closing the switch a predetermined number of times and returning to its original condition, and a connection between the breaker and the timer whereby the timer is put into operation by the breaker, said connection including a control circuit and a control for the circuit momentarily operated by the breaker upon opening of the breaker.

7. In combination, a circuit breaker, reclosing means for the breaker, and a control for the reclosing means including, a control switch for said means, a timer mechanism for the switch having a single determinate cycle of operation including closing the switch a predetermined number of times and returning to its original condition, and a connection between the breaker and the timer whereby the timer is put into operation by the breaker upon opening of the breaker, there being a time interval in the cycle of the timer between the last closing of the switch and return of the timer to its original condition sufficient to allow the breaker to close and open.

8. In combination, a circuit breaker, reclosing means for the breaker, and a control for the reclosing means including, a control switch for said means, a timer mechanism for the switch having a single determinate cycle of operation including closing the switch a predetermined number of times and returning to its original condition, and a connection between the breaker and the timer whereby the timer is put into operation by the breaker, said connection including a control circuit, and a control for the circuit momentarily operated by the breaker upon opening of the breaker, there being a time interval in the cycle of the timer between the last closing of the switch and return of the timer to its original condition sufficient to allow the breaker to close and open.

9. In combination, a circuit breaker, an overload relay for tripping the breaker, reclosing means for the breaker including a reclosing coil, a control relay for the reclosing coil, a switch controlling the relay, an electrically operated timer for actuating said switch, and a control for the timer including a latch for holding the timer in operation, electromagnetic means for setting the latch in holding position operated by the breaker upon opening of the breaker, means whereby the latch is released at a predetermined time after the timer has actuated said switch a predetermined number of times, and a trip free relay controlled by the overload relay and operable to deenergize the control relay.

10. In combination, a circuit breaker, reclosing means for the breaker including a reclosing coil, a switch controlling the reclosing coil, an electrically operated timer for actuating said switch, and a control for the timer including a latch for holding the timer in operation, electromagnetic means for setting the latch in holding position operated by the breaker upon opening of the breaker, and mechanical means whereby the latch is released at a predetermined time after the timer has actuated said switch a predetermined number of times.

11. In combination, a circuit breaker, reclosing means for the breaker including a reclosing coil, a switch controlling the reclosing coil, an electrically operated timer for actuating said switch, and a control for the timer including a latch for holding the timer in operation, electromagnetic means for setting the latch in holding position operated by the breaker upon opening of the breaker, and means whereby the latch is released at a predetermined time after the timer has actuated said switch a predetermined number of times, said electromagnetic means including a switch momentarily operated in the course of operation of the breaker.

12. In combination, a circuit breaker, reclosing means for the breaker including a reclosing coil, a switch controlling the reclosing coil, an electrically operated timer for actuating said switch, and a control for the timer including a latch for holding the timer in operation, electromagnetic means for setting the latch in holding position operable by the breaker, and means whereby the latch is released at a predetermined time after the timer has actuated said switch a predetermined number of times, said electromagnetic means including an electromagnet connected in a circuit, and a switch in said circuit operatively connected with the breaker to be momentarily closed by the breaker upon opening of the breaker.

13. In combination, a circuit breaker including a trip coil, and a reclosing coil, and a control for the breaker including a control switch for governing the energization of the reclosing coil, a timer for operating the switch, and a control for the timer including a switch momentarily closed by the breaker upon opening of the breaker to put the timer in operation, and a release for the timer operable to stop operation of the timer a predetermined time after a predetermined number of operations of the first mentioned switch.

14. In combination, a circuit breaker including an overload relay, a trip coil controlled by the overload relay, a reclosing coil, and a trip free relay, and a control for the breaker including a control switch for the reclosing coil, a timer for operating the switch, and a control for the timer including a switch momentarily closed by the breaker upon opening of the breaker to put the timer in operation, and a mechanical release for the timer operable to stop operation of the timer a predetermined time after a predetermined number of operations of the first mentioned switch, the trip free relay being controlled by the overload relay and operable to cause de-energization of the reclosing coil.

15. In combination, a circuit breaker including a trip coil, and a reclosing coil, and a control for the breaker including a control switch for the reclosing coil, an electrically actuated timer for operating the switch, and a control for the timer including a switch momentarily closed by the breaker upon opening of the breaker to put the timer in operation, and a release for the timer operable to stop operation of the timer a predetermined time after a predetermined number of operations of the first mentioned switch.

16. In combination, a circuit breaker including a trip coil, and a reclosing coil, and a control for the breaker including a control switch for the reclosing coil, a timer for operating the switch, and a control for the timer, including a switch, an electrically actuated latch operable to hold the switch closed, a control circuit for the latch momentarily closed by the breaker upon opening of the breaker, and a release for the timer operable to stop operation of the timer a predetermined time after a predetermined number of operations of the first mentioned switch.

17. In combination, a circuit breaker including a closing coil, a trip coil, an overload relay governing the trip coil, and trip free relay controlled by the overload relay and a control for the breaker including a control switch for governing the energization of the closing coil, a timer for operating the switch, a control circuit for the timer momentarily energized by the breaker upon opening of the breaker to put the timer into operation, and a release for the timer operable to stop operation of the timer a predetermined time after a predetermined number of operations of the switch, the trip free relay being controlled by the overload relay to permit only one closing of the breaker for each closing of the switch.

LLOYD F. HUNT.
EDWARD W. ROCKWELL.